United States Patent
Rock et al.

(10) Patent No.: US 7,459,227 B2
(45) Date of Patent: Dec. 2, 2008

(54) STAMPED FUEL CELL BIPOLAR PLATE

(75) Inventors: Jeffrey A. Rock, Fairport, NY (US);
Harald Schlag, Ruesselsheim (DE);
Kim R. Griffith, Honeoye Falls, NY (US)

(73) Assignee: General Motors Corporation, Detroit, MI (US)

(*) Notice: Subject to any disclaimer, the term of this patent is extended or adjusted under 35 U.S.C. 154(b) by 632 days.

(21) Appl. No.: 10/418,536

(22) Filed: Apr. 18, 2003

(65) Prior Publication Data
US 2004/0209150 A1 Oct. 21, 2004

(51) Int. Cl.
*H01M 8/02* (2006.01)

(52) U.S. Cl. .............................. 429/34; 429/12; 429/38; 429/39

(58) Field of Classification Search .................. 429/13, 429/26, 34–39
See application file for complete search history.

(56) References Cited

U.S. PATENT DOCUMENTS

| | | | |
|---|---|---|---|
| 5,108,849 A * | 4/1992 | Watkins et al. .............. 429/30 |
| 5,514,487 A | 5/1996 | Washington et al. | |
| 5,686,199 A | 11/1997 | Cavalca et al. | |
| 5,776,624 A | 7/1998 | Neutzler | |
| 5,863,671 A * | 1/1999 | Spear et al. .............. 429/12 |
| 5,981,098 A | 11/1999 | Vitale | |
| 5,998,055 A * | 12/1999 | Kurita et al. .............. 429/34 |
| 6,054,228 A * | 4/2000 | Cisar et al. .............. 429/18 |
| 6,099,984 A | 8/2000 | Rock | |
| 6,159,629 A | 12/2000 | Gibb et al. | |
| 6,309,773 B1 | 10/2001 | Rock | |
| 6,358,642 B1 | 3/2002 | Griffith et al. | |
| 6,406,809 B1 * | 6/2002 | Fujii et al. .............. 429/34 |
| 6,503,653 B2 | 1/2003 | Rock | |
| 6,777,126 B1 * | 8/2004 | Allen .............. 429/34 |
| 6,833,210 B2 * | 12/2004 | Kikuchi et al. .............. 429/26 |
| 6,884,536 B1 * | 4/2005 | Hatoh et al. .............. 429/34 |
| 2003/0012999 A1 * | 1/2003 | Yoshioka et al. .............. 429/34 |

OTHER PUBLICATIONS

International Search Report; dated Jul. 30, 2003.
Notification of Transmittal Of The International Search Report Or The Declaration, dated Sep. 9, 2003.

* cited by examiner

*Primary Examiner*—Susy Tsang-Foster
*Assistant Examiner*—Alix Echelmeyer

(57) ABSTRACT

A bipolar plate assembly for a fuel cell having a pair of stamped plates joined together to define a coolant volume therein. Each of the pair of stamped plates have a flow field arranged to maximize the contact area between the plates while allowing coolant to distribute and flow readily within the coolant volume. The bipolar plate assembly further includes a seal arrangement and integral manifold to direct gaseous reactant flow through the fuel cell.

11 Claims, 9 Drawing Sheets

STAMPED FUEL CELL BIPOLAR PLATE

TECHNICAL FIELD

This invention relates to a fuel cell stack assembly and more particularly to a bipolar plate assembly having a pair of stamped metal plates bonded together to provide coolant volume therebetween.

BACKGROUND OF THE INVENTION

Fuel cells have been proposed as a power source for many applications. One such fuel cell is the proton exchange membrane or PEM fuel cell. PEM fuel cells are well known in the art and include an each cell thereof a so-called membrane-electrode-assembly or MEA having a thin, proton conductive, polymeric membrane-electrolyte with an anode electrode film formed on major face thereof and a cathode electrode film formed on the opposite major face thereof. Various membrane electrolytes are well known in the art and are described in such as U.S. Pat. Nos. 5,272,017 and 3,134,697, as well as in the *Journal of Power Sources*, vol. 29 (1990) pgs. 367-387, inter alia.

The MEA is interdisposed between sheets of porous gas-permeable, conductive material known as a diffusion layer which press against the anode and cathode faces of the MEA and serve as the primary current collectors for the anode and cathode as well as provide mechanical support for the MEA. This assembly of diffusion layers and MEA are pressed between a pair of electronically conductive plates which serve as secondary current collectors for collecting the current from the primary current collectors and for conducting current between adjacent cells internally of the stack (in the case of bipolar plates) and externally of the stack (in the case of monopolar plates at the end of the stack). Secondary current collector plates each contain at least one active region that distributes the gaseous reactants over the major faces of the anode and cathode. These active regions also known as flow fields typically include a plurality of lands which engage the primary current collector and define therebetween a plurality of grooves or flow channels through which the gaseous reactant flow between a supply header and a header region of the plate at one of the channel and an exhaust header in a header region of the plate at the other end of the channel. In the case of bipolar plates, an anode flow field is formed on a first major face of the bipolar plate and a cathode flow field is formed on a second major face opposite the first major face. In this manner, the anode gaseous reactant (e.g., $H_2$) is distributed over the surface of the anode electric film and the cathode gaseous reactant (e.g., $O_2$/air) is distributed over the surface of the cathode electrode film.

The various concepts of been employed to fabricate a bipolar plate having flow fields formed on opposite major faces. For example, U.S. Pat. No. 6,099,984 discloses bipolar plate assembly having a pair of thin metal plates with an identical flow field stamped therein. These stamped metal plates are positioned in opposed facing relationships with a conductive spacer interposed therebetween. This assembly of plates and spacers are joined together using conventional bonding technology such as brazing, welding, diffusion bonding or adhesive bonding. Such bipolar plate technology has proved satisfactory in its gas distribution function, but results in a relatively thick and heavy bipolar plate assembly and thus impacts the gravimetric and volumetric efficiency of the fuel cell stack assembly.

In another example, U.S. Pat. No. 6,503,653 discloses a single stamped bipolar plate in which the flow fields are formed in opposite major faces thereof to provide a non-cooled bipolar plate. A cooled bipolar plate using this technology again requires a spacer element interposed between a pair of stamped plates, thereby increasing the thickness and weight of the cooled plate assembly. U.S. Pat. No. 6,503,653 takes advantage of unique reactant gas porting and staggered seal arrangements for feeding the reactant gases from the header region through the port in the plate to the flow field formed on the opposite side thereof. This concept is very desirable in terms of cost but its design constraints on flow fields may rule out some application. Furthermore, this design concept does not lend itself readily to providing an internal cooling flow.

Applications with high powered density requirements need cooling in about every other fuel cell. Thus, there is an ever present desire to refine the design of a bipolar plate assembly to be efficiently used in a fuel cell stack to provide a high gravimetric power density, high volumetric power density, low cost and higher reliability. The present invention is directed to a stamped fuel cell bipolar plate that offers significant flow field design flexibility while minimizing the weight and thickness thereof.

SUMMARY OF THE INVENTION

The present invention is directed to a bipolar plate assembly having two thin metal plates formed with conventional stamping processes and then joined together. In another aspect, the centerlines of the flow fields must be arranged to align the channels for plates on opposite sides of the MEA wherever possible to further provide uniform compression of the diffusion media. In another aspect, the configuration of the flow fields formed in each of the two stamped metal plates are such that the contact area therebetween is maximized to enable the bipolar plate assembly to carry compressive loads present in a fuel cell stack. Thus, the centerlines of the flow fields formed in the two thin metal plates of a bipolar plate assembly need to be coincident in many places to carry the compressive loads. However, since the interior volume defined between the plates and their context areas form an interior cavity for coolant flow, it is necessary to have sufficient instances where the centerlines are not coincident in order to allow adequate coolant flow. The present invention achieves these two apparently opposing objections with a unique flow field design in which ajoining areas of the flow channels adjacent the inlet and exhaust margins provide a geometric configurations to provide the desired flow field and contact area requirements.

The present invention provides a bipolar plate assembly which includes a pair of plates having reactant gas flow fields defined by a plurality of channels formed the outer faces of the plates. The plates are arranged in a facing relationship to define an interior volume therebetween. A coolant flow field is formed in an interior volume defined between the pair of plates at the contact interface therebetween. The coolant flow field has an array of discrete flow disruptors adjacent a coolant header inlet and a plurality of parallel channels interposed between the array and the coolant exhaust header. Fluid communication is provided from the coolant inlet header through the coolant flow field to the coolant exhaust header.

The present invention also provides a separator plate which includes a thin plate having an inlet margin with a pair of lateral inlet headers and a medial inlet header formed therethrough, an exhaust margin including a pair of lateral exhaust headers and a medial exhaust header formed therethrough and a reactant gas flow field formed on a major face of the thin plate. The reactant gas flow field includes a first set of flow channels, each having an inlet leg with a first longitudinal portion in fluid communication with one of the pair of lateral inlet headers and a first transverse portion, a serpentine leg having a first end in fluid communication with the first transverse portion and a second end and an exhaust leg having a second transverse portion in fluid communication with the second end of the serpentine leg and a second longitudinal portion in fluid communication with one of the pair of lateral exhaust headers. Either of the transverse portion of the inlet leg adjacent the medial inlet header and the transverse portion of the exhaust leg adjacent the medial exhaust header may be defined by an undulating flow channel.

These and other aspects of the present invention provide a bipolar plate assembly which increases the design flexibility in terms of flow field options, while achieving the cooling requirements as well as providing a relatively high gravimetric power density and high volumetric power density from a fuel cell stack incorporating the bipolar plate assembly.

BRIEF DESCRIPTION OF THE DRAWINGS

The invention will be better understood when considered in the light of the following detailed description of a specific embodiment thereof which is given hereafter in conjunction with the several figures in which.

DESCRIPTION OF THE PREFERRED EMBODIMENT

Figure 1:
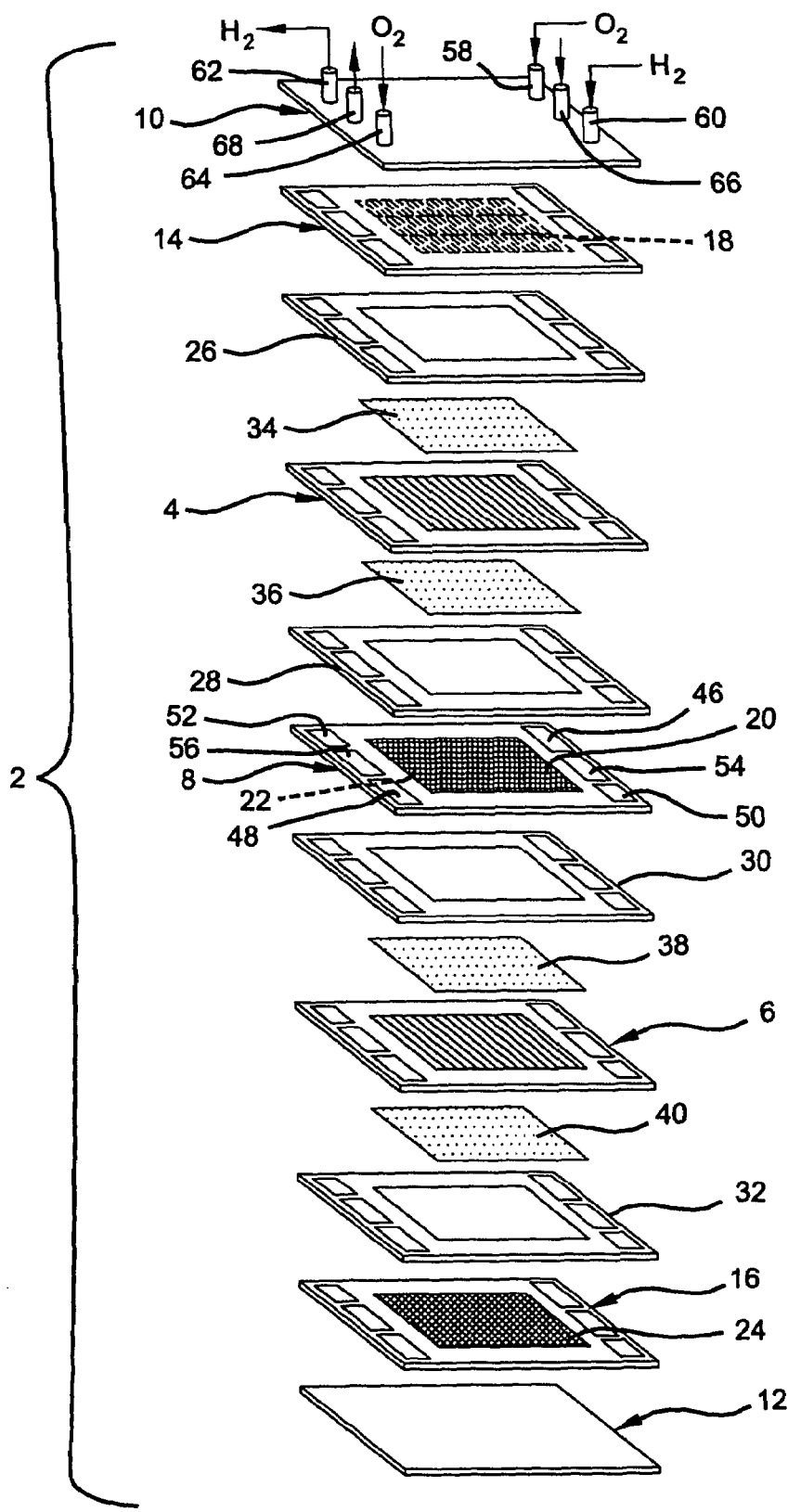
FIG. 1 is a schematic isometric exploded illustration of a fuel cell stack.

The following description of the preferred embodiment is merely exemplary in nature and is in no way intended to limit the invention, its application, or uses. With reference to FIG. 1, a two-cell stack (i.e., one bipolar plate) is illustrated and described hereafter, it being understood that a typical stack will have many more such cells and bipolar plates. FIG. 1 depicts a two-cell bipolar PEM fuel cell stack 2 having a pair of membrane-electrode-assemblies (MEAs) 4, 6 separated from each other by an electrically conductive, liquid-cooled bipolar plate 8. The MEAs 4, 6 and bipolar plate 8 are stacked together between clamping plates 10, 12 and monopolar end plates 14, 16. The clamping plates 10, 12 are electrically insulated from the ends plate 14, 16. The working face of each monopolar end plates 14, 16, as well as both working faces of the bipolar plate 8 contain a plurality of grooves or channels 18, 20, 22, 24 defining a so-called "flow field" for distributing fuel and oxidant gases (i.e., $H_2$ and $O_2$) over the faces of the MEAs 4, 6. Nonconductive gaskets 26, 28, 30 and 32 provide seals and electrical insulation between the several components of the fuel cell stack. Gas-permeable diffusion media 34, 36, 38, 40 press up against the electrode faces of the MEAs 4, 6. The end plates 14, 16 press up against the diffusion media 34, 40 respectfully, while the bipolar plate 8 presses up against the diffusion media 36 on the anode face of MEA 4, and against the diffusion media 38 on the cathode face of MEA 6.

Figure 2:
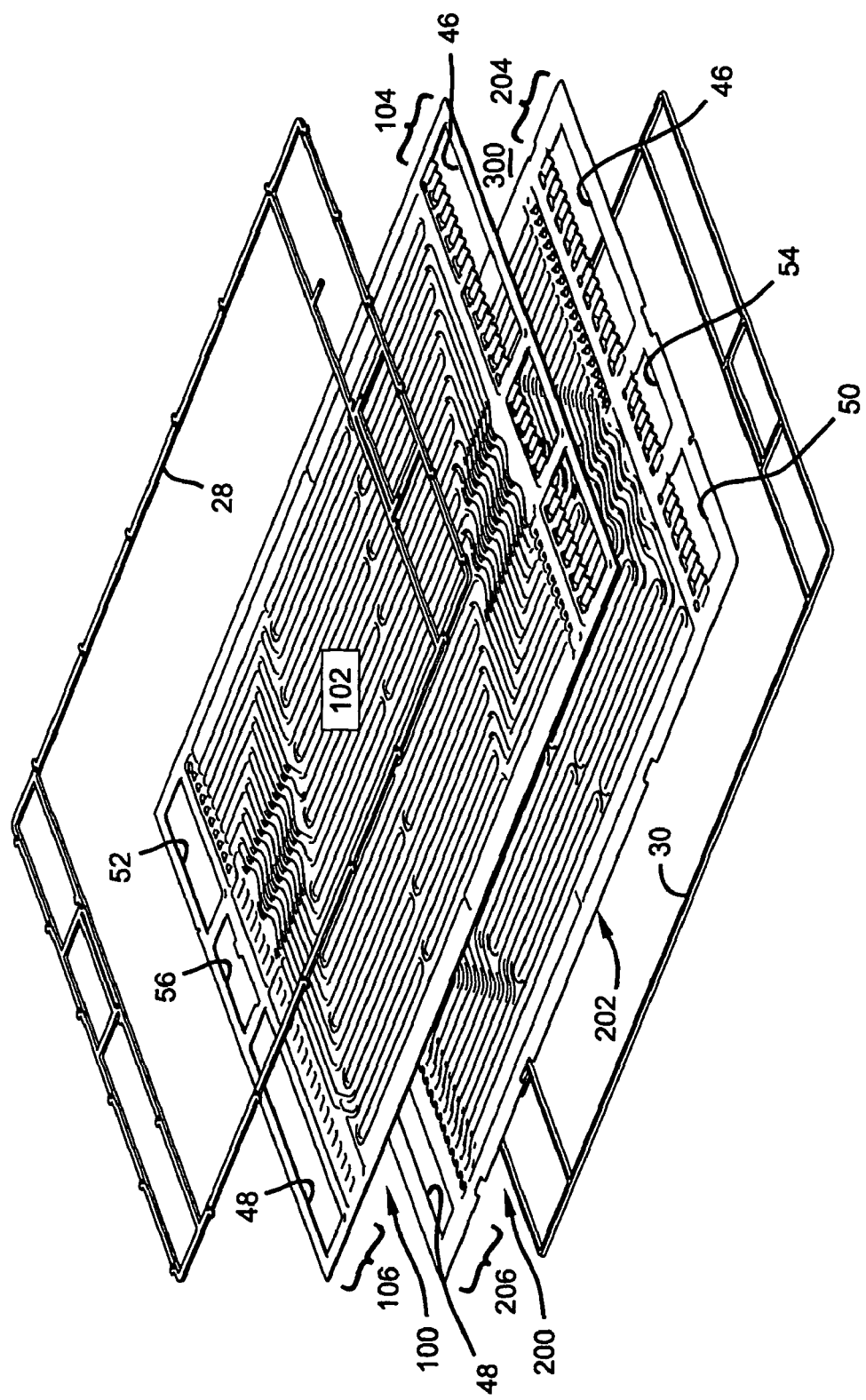
FIG. 2 is an isometric exploded illustration of a bipolar plate assembly and seal arrangement in accordance with the present invention.

With reference to FIG. 2, the bipolar plate assembly 8 includes two separate metal plates 100, 200 which are bonded together so as to define a coolant volume therebetween. The metal plates 100, 200 are made as thin as possible (e.g., about 0.002-0.02 inches thick) and are preferably formed by suitable forming techniques as is known in the art. Bonding may, for example, be accomplished by brazing, welding diffusion bonding or gluing with a conductive adhesive as is well known in the art. The anode plate 100 and cathode plate 200 of a bipolar plate assembly 8 are shown having a central active region that confronts the MEAs 36, 38 (shown in FIG. 1) and bounded by inactive regions or margins.

The anode plate 100 has a working face with an anode flow field 102 including a plurality of serpentine flow channels for distributing hydrogen over the anode face of the MEA that it confronts. Likewise, the cathode plate 200 has a working face with a cathode flow field 202 including a plurality of serpentine flow channels for distributing oxygen (often in the form of air) over the cathode face of the MEA that it confronts. The active region of the bipolar plate 8 is flanked by two inactive border portions or margins 104, 106, 204, 206 which have openings 46-56 formed therethrough. When the anode and cathode plates 100, 200 are stacked together, the openings 46-56 in the plates 100, 200 are aligned with like openings in adjacent bipolar plate assemblies. Other components of the fuel cell stack 2 such as gaskets 26-32 as well as the membrane of the MEAs 4 and 6 and the end plates 14, 16 have corresponding openings that align with the openings in the bipolar plate assembly in the stack, and together form headers for supplying and removing gaseous reactants and liquid coolant to/from the stack.

In the embodiment shown in the figures, opening 46 in a series of stacked plates forms an air inlet header, opening 48 in series of stacked plates forms an air outlet header, opening 50 in a series of stacked plates forms a hydrogen inlet header, openings 52 in a series of stacked plates forms a hydrogen outlet header, opening 54 in a series of stacked plates forms a coolant inlet header, and opening 56 in a series of stacked plates forms a coolant outlet header. As shown in FIG. 1, inlet plumbing 58, 60 for both the oxygen/air and hydrogen are in fluid communication with the inlet headers 46, 50 respectively. Likewise, exhaust plumbing 62, 64 for both the hydrogen and the oxygen/air are in fluid communication with the exhaust headers 48, 52 respectively. Additional plumbing 66, 68 is provided for respectively supplying liquid coolant to and removing coolant from the coolant header 54, 56.

FIG. 2 illustrates a bipolar plate assembly 8 and seals 28, 30 as they are stacked together in a fuel cell. It should be understood that a set of diffusion media, an MEA, and another bipolar plate (not shown) would underlie the cathode plate 200 and seal 30 to form one complete cell. Similarly, another set of diffusion media and MEAs (not shown) will overlie the anode plate 100 and seal 28 to form a series of repeating units or cells within the fuel cell stack. It should also be understood that an interior volume or coolant cavity 300 is formed directly between anode plate 100 and cathode plate 200 without the need of an additional spacer interposed therebetween.

Figure 3:
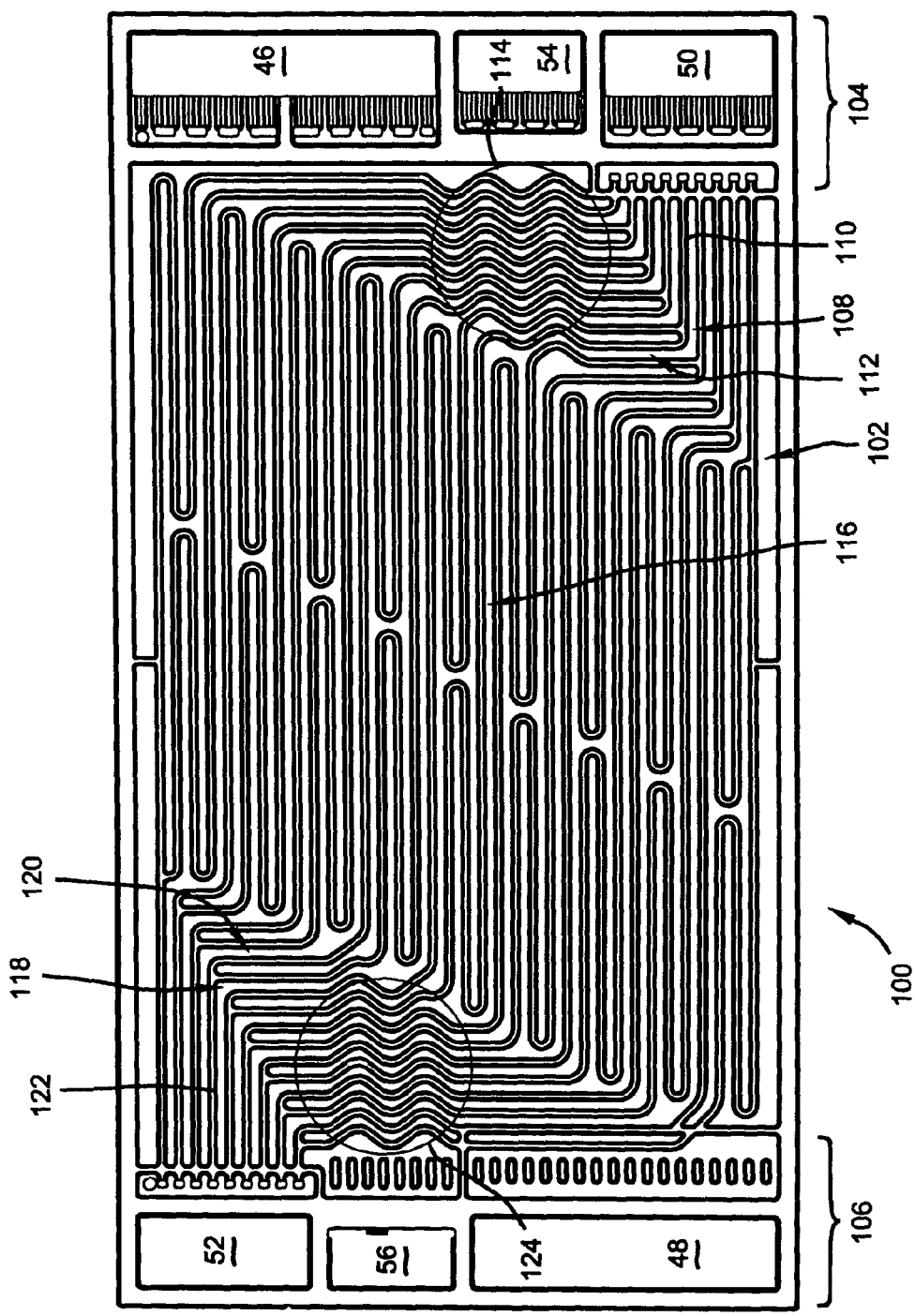
FIG. 3 is a plan view of the flow field formed in the major face of an anode plate in the bipolar plate assembly shown in FIG. 2.

Turning now to FIG. 3, a plan view of the anode plate 100 is provided which more clearly shows the anode flow field 102 formed in the working face of anode plate 100. As can also be clearly seen in FIG. 3, the inlet margin 104 of anode plate 100 has a pair of lateral inlet headers 46 and 50 to transport cathode gas and anode gas, respectively, through the fuel cell stack and a medial inlet header 54 to transport a coolant through the stack. Similarly, the exhaust margin 106 has a pair of lateral exhaust headers 48, 52 for transporting anode affluent and cathode affluent, respectively through the fuel cell stack, and a medial exhaust header 56 for transporting coolant through the fuel cell stack.

The anode flow field 102 is defined by a plurality of channels formed to provide fluid communication along a tortuous path from the anode inlet header 50 to the anode exhaust header 52. In general, the flow channels are characterized by an inlet leg 108 having a longitudinal portion 110 with a first end in fluid communication with the anode inlet header 50 and a second end in fluid communication with a transverse portion 112. As presently preferred, the transverse portion 112 of the inlet leg 108 branches to provide a pair of transverse inlet legs associated with each longitudinal portion 110. Furthermore, the path of these transverse inlet portions 112 undulate within the plane of the anode plate 100 to provide an undulating flow channel adjacent the coolant inlet header 54 as represented in the area designated 114. The transverse portion 112 of inlet leg 108 is in fluid communication with a serpentine leg 116. The flow channel 108 further includes an exhaust leg 118 having transverse portions 120 and a longitudinal portion 122 to provide fluid communication from the serpentine leg 116 to the anode exhaust header 52. The exhaust leg portion 118 is configured similar to the inlet leg portion 108 in that each longitudinal portion 122 is associated with a pair of transverse portions 120. The path of the transverse exhaust portions 120 undulate within the plane of the anode plate 100 to provide an undulating flow channel adjacent the coolant exhaust header 56 as represented in the area designated 124.

Figure 4:
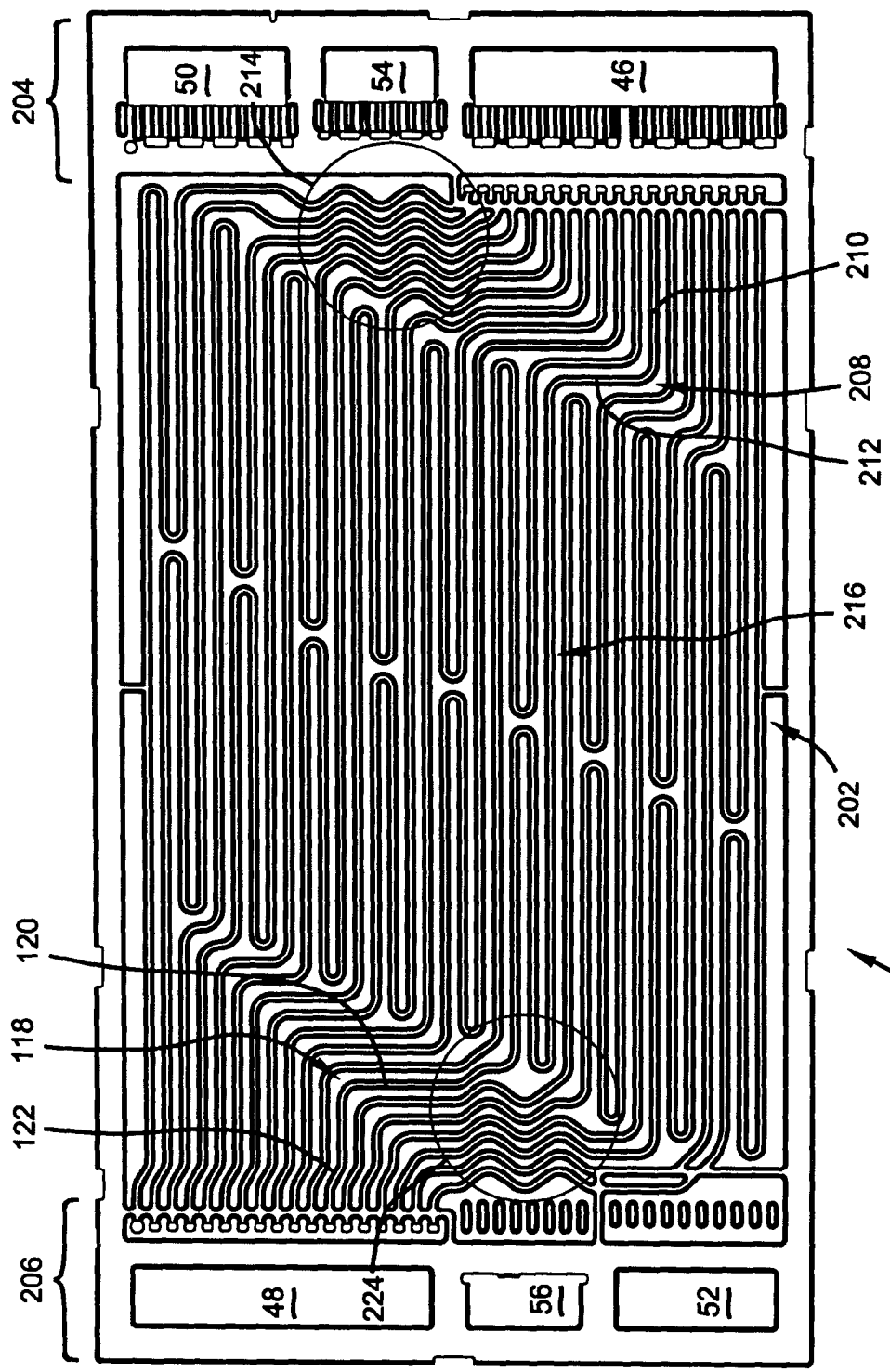
FIG. 4 is a plan view of the flow field formed in the major face of a cathode plate in the bipolar plate assembly shown in FIG. 2.

Turning now to FIG. 4 a plan view of the cathode plate 200 is provided which more clearly shows the cathode flow field 202 formed in the working face of cathode plate 200. As can also be clearly seen in FIG. 4, the inlet margin 204 of cathode plate 200 has a pair of lateral inlet headers 46, 50 to transport cathode gas and anode gas, respectively, through the fuel cell stack and a medial inlet header 54 to transport a coolant through the stack. Similarly, the exhaust margin 206 has a pair of lateral exhaust headers 48, 52 for transporting anode affluent and cathode affluent, respectively through the fuel cell stack, and a medial exhaust header 56 for transporting coolant through the fuel cell stack.

The cathode flow field 202 is defined by a plurality of channels formed to provide fluid communication along a tortuous path from the cathode inlet header 46 to the cathode exhaust header 48. In general, the flow channels are characterized by an inlet leg 208 having a longitudinal portion 210 with a first end in fluid communication with the cathode inlet header 46 and a second end in fluid communication with a transverse portion 212. A single transverse portion 212 is associated with each longitudinal portion 210. Thus, the transverse portion 212 of the inlet leg 208 does not branch off to provide a pair of transverse inlet portions as the transverse portion 112 of anode inlet leg 108. The path of the transverse inlet portions 212 undulate within the plane of the cathode plate to provide an undulating flow channel adjacent the coolant inlet header 54 as represented in the area designated 214. The flow channel further includes a serpentine leg 216 which is in fluid communication with the end of transverse inlet portion 212. The flow channel further includes an exhaust leg 218 having a transverse portion 220 and a longitudinal portion 222. The exhaust leg portion 218 is configured similar to the inlet leg portion 208 to provide fluid communication from the serpentine leg 216 to the cathode exhaust header 48. The path of the transverse exhaust portions 220 undulate within the plane of the cathode plate to provide an undulating flow channel adjacent the coolant exhaust header 56 as represented in the area designated 224.

Figure 6:
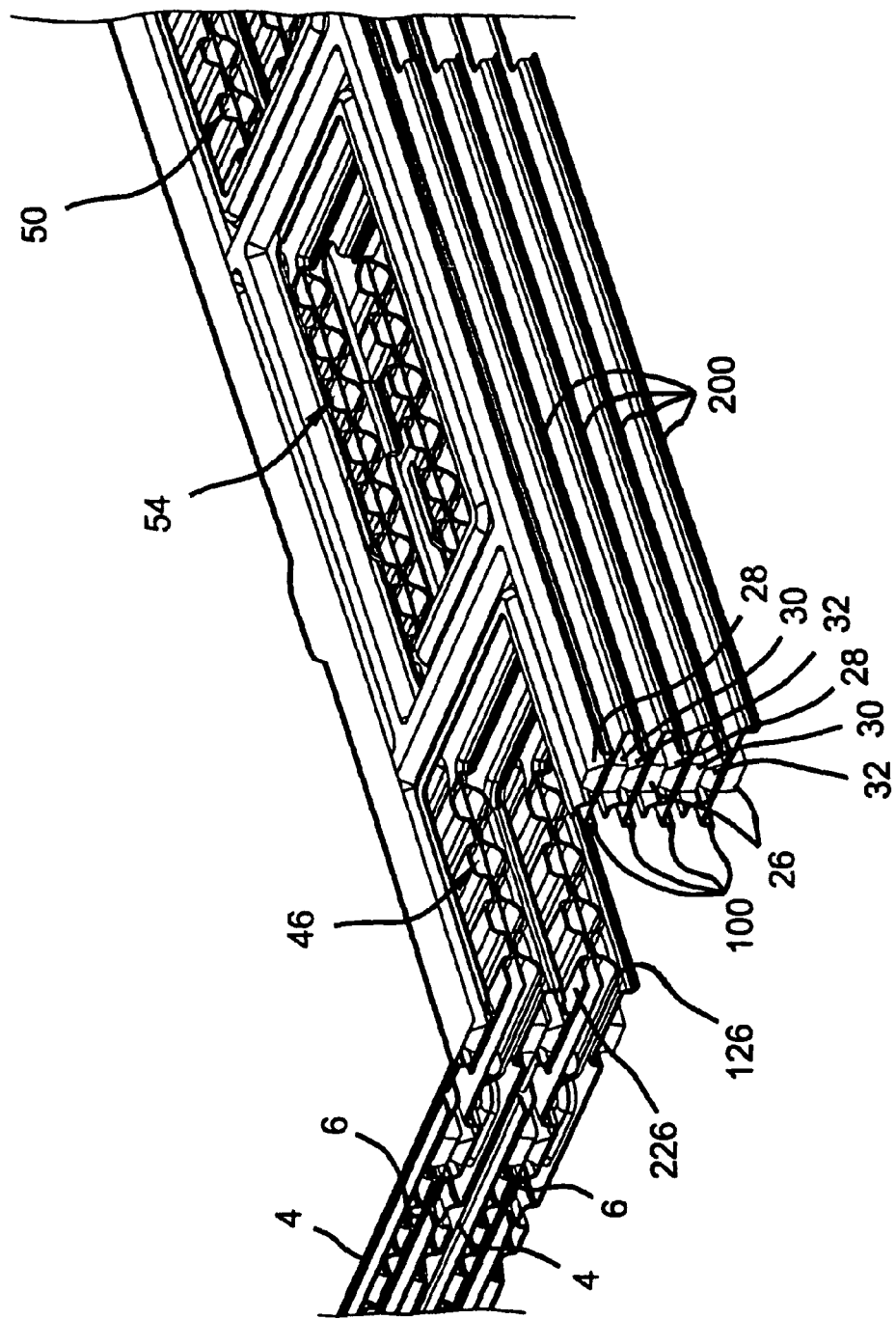
FIG. 6 is an isometric view of multiple cells within the fuel cell stack and further showing a section taken through the cathode header.

Referring now to FIGS. 2 and 6, the anode plate 100 and the cathode plate 200 are positioned in an opposed facing relationship such that the various inlet and exhaust headers are in alignment. The anode plate 100 and the cathode plate 200 are then joined together using conventional techniques. The centerlines of the anode flow fields 102 and cathode flow fields 202 are arranged to align the flow channels on opposing plates (e.g. on opposite sides of the MEA as shown in FIG. 6) wherever possible to provide uniform compression of the diffusion media and the MEA. Likewise, the contact area between the adjacent, joined anode plate 100 and cathode plate 200 (as shown in FIG. 2) are coincident in many places so as to carry the compressive loads imposed on the fuel cell stack. Specifically, the flow channels of anode flow field 102 formed in the working face of anode plate 100 provide a complimentary contact surface on an inner face opposite the working face. Similarly, the flow channels of the cathode flow field 202 formed in the working face of the cathode plate 200 define a contact surface on an inner face of the cathode plate 200. Thus, when the anode plate 100 and cathode plate 200 are joined together, an interference or contact area is defined therebetween.

Figure 5:
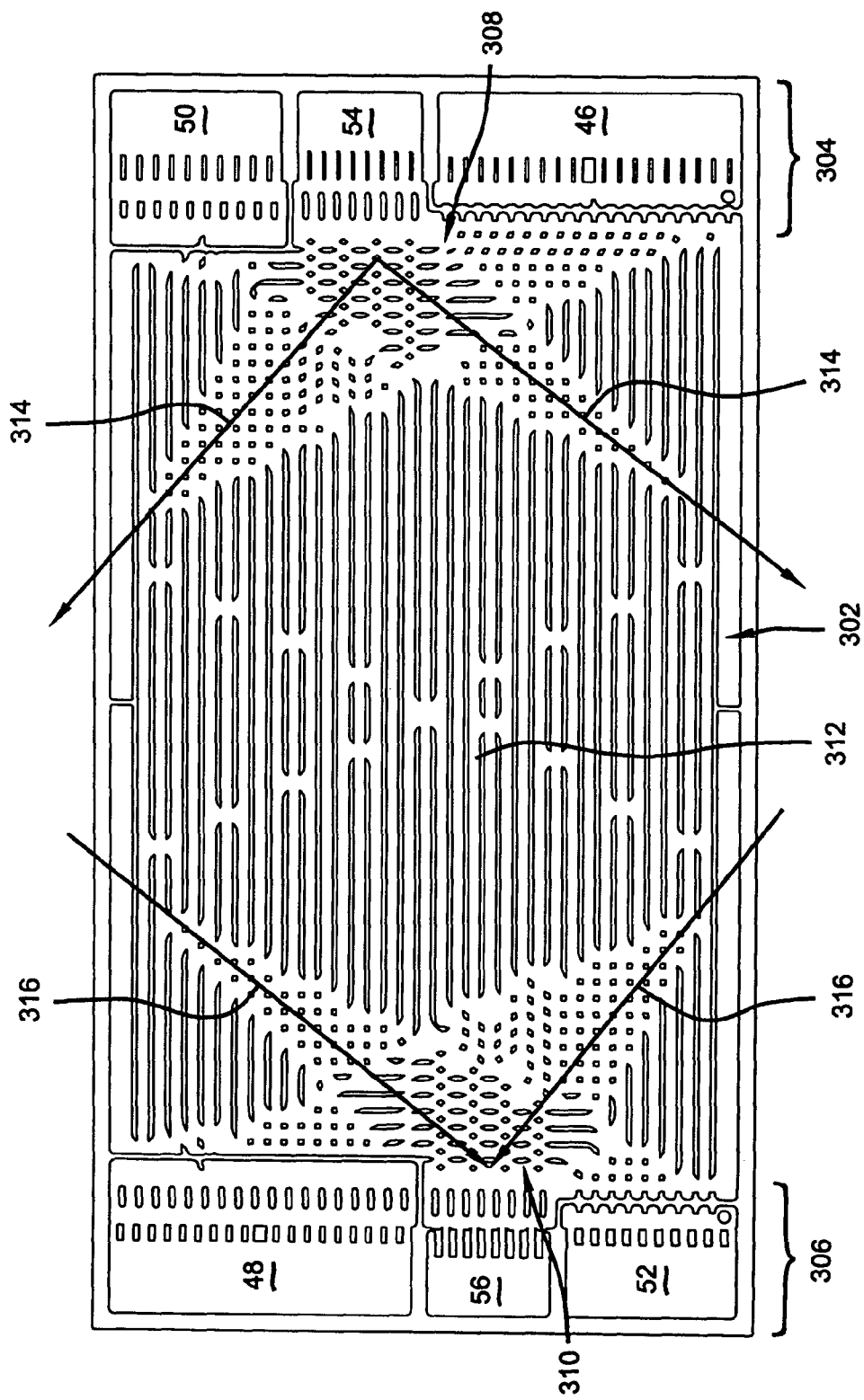
FIG. 5 is a plan view showing the contact areas at the interface between the anode and cathode plates.

With reference now to FIG. 5, the contact area between the anode plate 100 and the cathode plate 200 defines a coolant flow field 302 between an inlet margin 304 and an exhaust margin 306 within coolant cavity 300. The coolant flow field 302 includes an array of discrete flow disruptors 308 adjacent the coolant inlet manifold 54 formed at the interface of the anode inlet legs 108 and the cathode inlet legs 208. Similarly, a set of flow disrupters 310 are formed adjacent the coolant exhaust header 56 at the interface of the anode exhaust leg 118 and the cathode exhaust legs 218. The coolant flow field 302 further includes a plurality of parallel of flow channels 312 interposed between the inlet margin 304 and the exhaust margin 306 which are defined at the interface of the serpentine legs 116 and the serpentine legs 216. In accordance with the configuration of the anode flow field 102 and cathode flow field 202, the array of discrete flow disruptors 308 extend obliquely from the area of the coolant flow field 302 adjacent the coolant inlet header 54 as indicated by directional arrow 314 into the parallel flow channels 312. Likewise, the array of discrete flow disruptors 310 extend from the parallel flow channels 312 obliquely towards the coolant exhaust header 56 as indicated by directional arrow 316.

Figure 7:
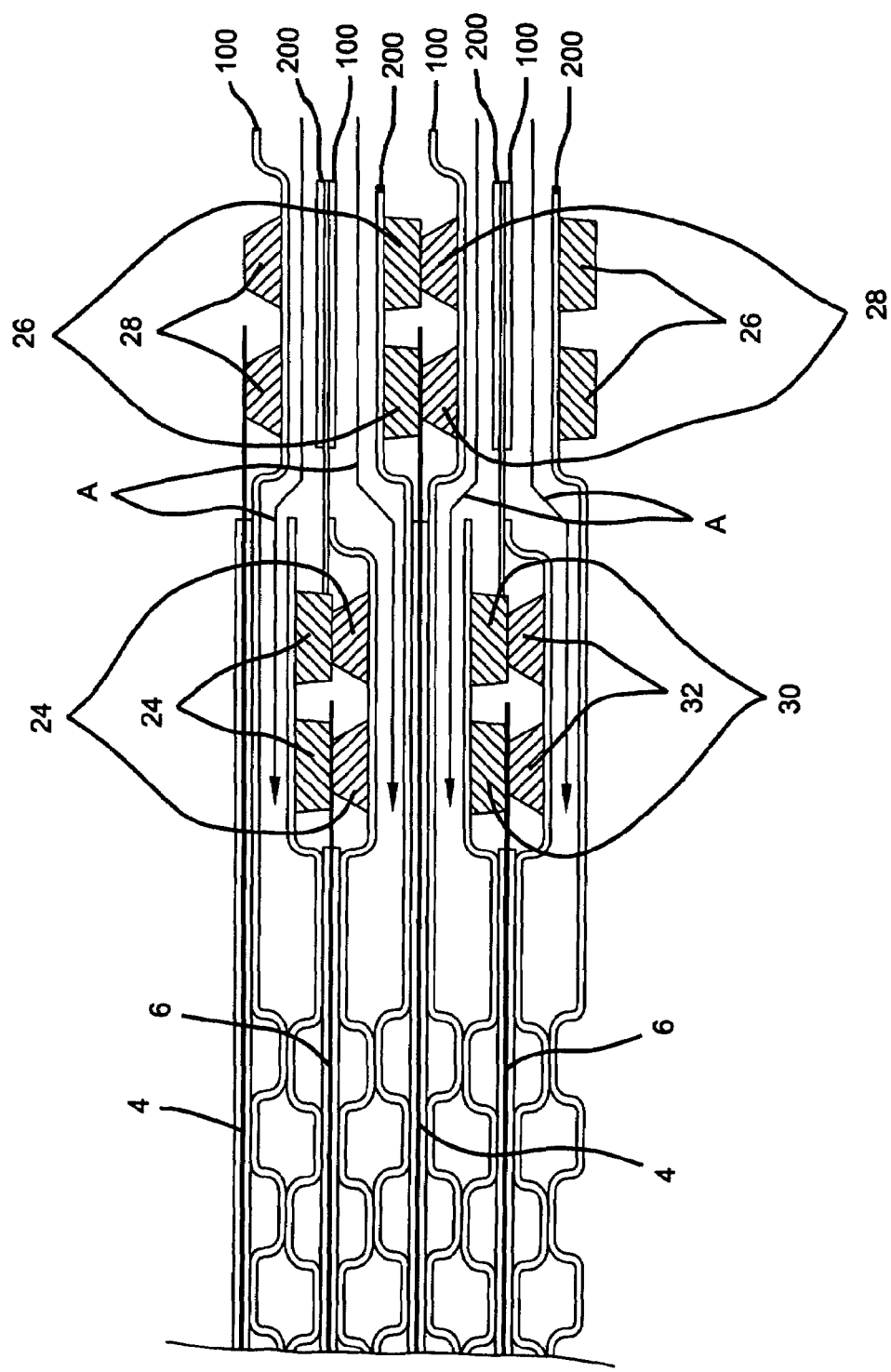
FIG. 7 is a cross-section taken through the coolant header and showing the coolant flow path.
Figure 8:
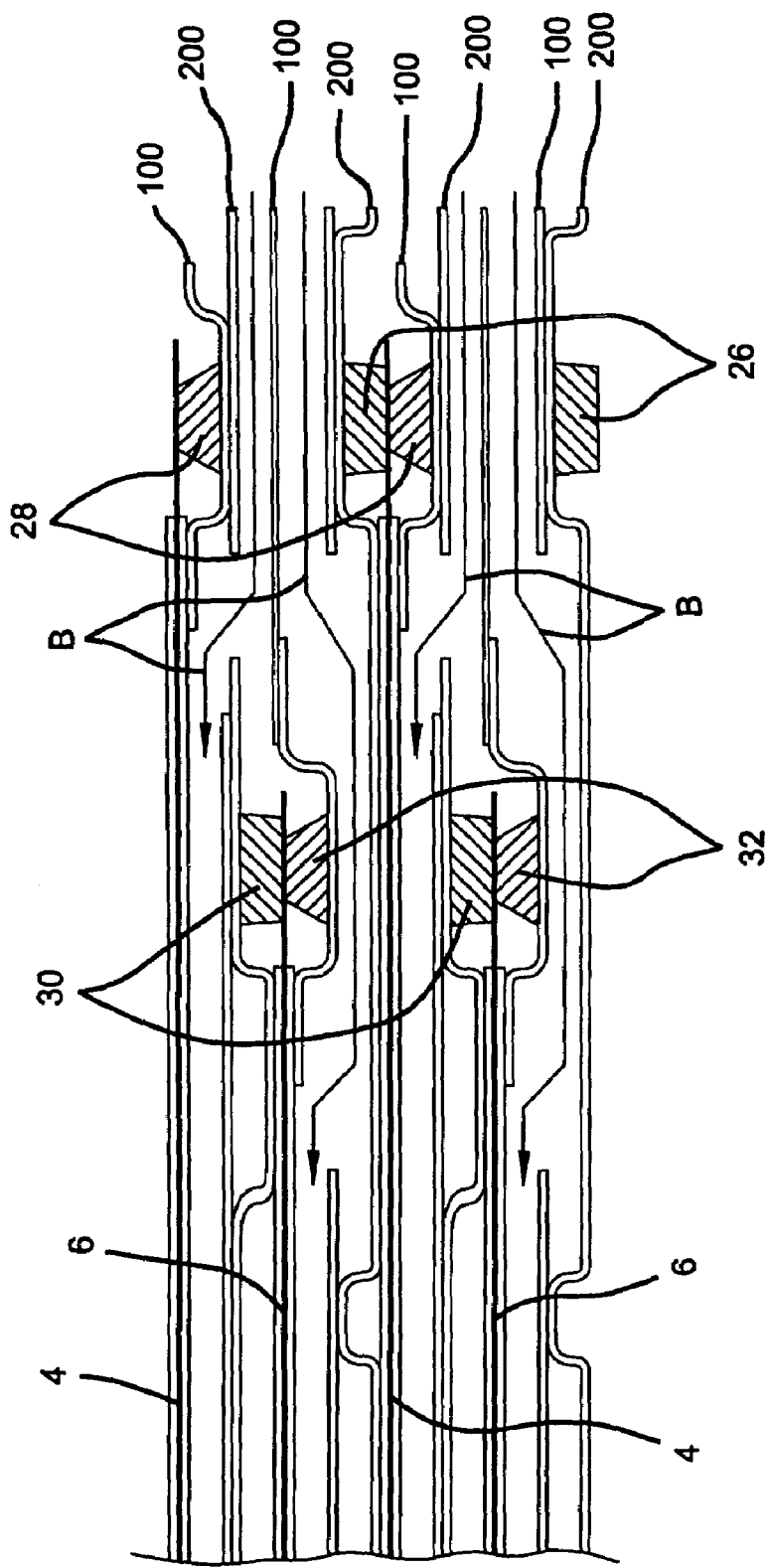
FIG. 8 is a cross-section taken through the anode header and showing the anode gas flow path.
Figure 9:
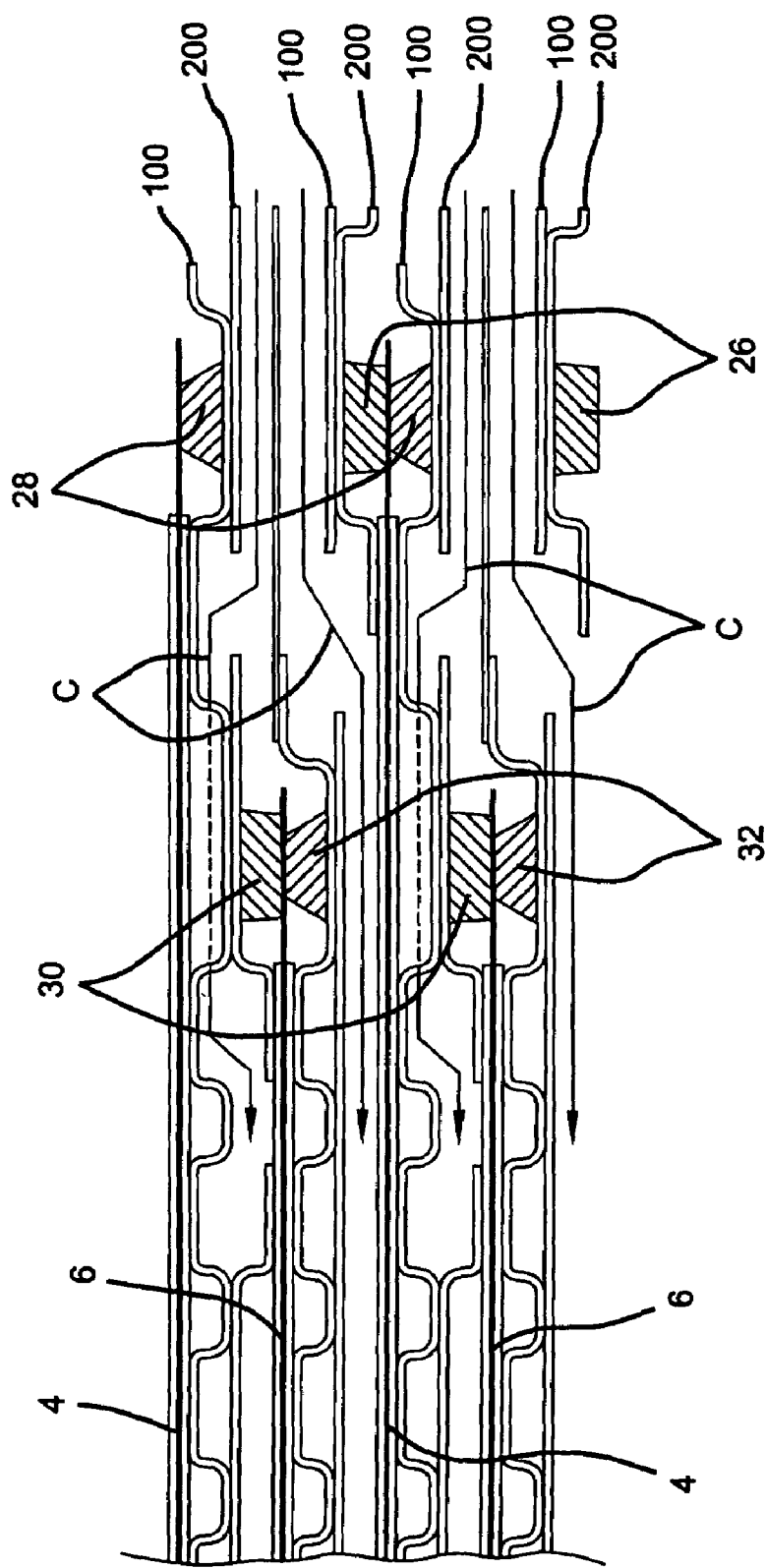
FIG. 9 is a cross-section taken through the cathode header and showing the cathode flow path.

Turning now to FIGS. 6-9, the present invention incorporates a staggered seal and an integral manifold configuration for directing fluid communication from the header into the appropriate flow field. For example, the location of the seal beads between the inlet margin 104, 204 and the flow field structure 102, 202 step left and right (as seen in FIGS. 7-9) for each successive layer. Thus, the seal position shifts to provide fluid communication therebetween. Ports in the form of holes or slots penetrate vertically through the anode plate 100 or cathode plate 200 to provide means for fluid communication from the header to the flow field. In this manner, the present invention employs a staggered seal concept similar to that disclosed in U.S. Pat. No. 6,503,653, which is commonly owned by the assignee of the present invention and whose disclosure is expressly incorporated by reference herein. This approach allows the combined seal thicknesses to equal the repeat distance minus the thickness of the anode plate and cathode plate. This approach also provides an advantage over other conventional fuel cell stack design in which the thickness available for seals is reduced by the height required for the fluid passage from the header region to the active area region. By utilizing a staggered seal concept, the present invention affords the use of thicker seals which are less sensitive to tolerance variations.

The present invention further improves upon the staggered seal concept disclosed in U.S. Pat. No. 6,503,653 with the use of separate anode plate 100 and cathode plate 200 in each bipolar plate assembly. Specifically, a second plate enables the use of an integral manifold with the space between the plates. Reactant gases can now enter on the top side of the upper plate, travel between the upper and lower plate through such integral manifolds and then enter the lower side of the upper plate to feed the bottom side of the MEA. Similarly, coolant fluid can now enter on the top side of the upper plate, travel between the upper and lower plate through such integral manifolds and then enter the coolant flow field. As a result, the width of the region where the reactant gases and coolant fluid enter the flow field is twice as wide as that disclosed in U.S. Pat. No. 6,503,653, thereby lowering the overall pressure drop across a given flow field. This aspect of the present invention is best illustrated in FIGS. 7-9. Specifically, as illustrated in FIG. 7, the coolant flow path is indicated by the arrows A showing flow from the coolant header (not shown) between the anode plate 100 and the cathode plate 200 and into the coolant flow field 302 defined therebetween. Similarly, in FIG. 8 the anode gas flow path is indicated by the arrows B showing flow from the anode header (not shown) between the cathode plate 200 and the anode plate 100 and into the anode flow field 102. Similarly, in FIG. 9 the cathode gas flow path is indicated by the arrows C showing flow from the cathode header (not shown) between the anode plate 100 and the cathode plate 200 and into the cathode flow field 202. In this manner, a wider manifold region is provided between the header region and the flow field region for each of the fluids passed through the fuel cell stack.

As presently preferred, the design of the bipolar plate assembly further includes an additional feature to support the seal loads given the effect of widening the inlet manifold region between the headers and the active flow fields. Specifically, as best seen in FIGS. 4 and 6 an in-situ support flange 226 extends transversely across the inlet margin through the cathode inlet header 46, the coolant inlet header 54 and the anode header 50. This support flange 226 is formed with a wavy or corrugated configuration to allow inlet fluids to freely pass from the header region through the manifold region into the flow field region while at the same time providing through plane support for the bipolar plate assembly. For example, as best seen in FIG. 6, the support flange 226 for the cathode plate 200 of the bipolar plate 8 occurs directly over the support flange 126 for the anode plate 100 of the neighboring cell. In this manner, compressive loads are readily transmitted through the fuel cell stack. Alternately, the support function could be provided with grooved blocks of a non-conductive material or similar features which could be formed in the seals to replace the in-situ configuration provided by the transverse support flange.

When using this configuration, these adjacent regions must be insulated since they are at different electrical potentials. Various suitable means are available such as the use of a non-conductive coating such as that disclosed in U.S. application Ser. No. 10/132,058 entitled "Fuel Cell Having Insulated Coolant Manifold" filed on Apr. 25, 2002 which is commonly owned by the assignee of the present invention and the disclosure of which is expressly incorporated by reference. Alternately, a film of non-conductive plastic tape my be interposed for providing electrical isolation therebetween.

The present invention provides a two piece bipolar plate assembly having a coolant flow field formed therebetween. The configuration of the various flow fields are such that the bipolar plate assembly may be a formed of relatively thin material, and still support the required compressive loads of the fuel cell stack. Furthermore, the present invention provides much greater design flexibility in terms of flow field options. In this regard, the present invention provide an improvement in the gravimetric and volumetric power densities of a given fuel cell stack as well as significant material and cost savings.

The description of the invention set forth above is merely exemplary in nature and, thus, variations that do not depart from the jest of the invention are intended to be within the scope of the invention. Such variations are not to be regarded as a departure from the spirit and scope of the invention.

What is claimed is:

1. A separator plate for a bipolar plate assembly for a fuel cell comprising: a thin plate having an inlet margin including a pair of reactant gas inlet headers and a coolant inlet header formed therethrough, an exhaust margin including a pair of reactant gas exhaust headers and a coolant exhaust header formed therethrough and a flow field formed on a major face of said thin plate, said flow field including a first set of flow channels, each of said first set of flow channels having an inlet leg with a first longitudinal portion in fluid communication with one of said pair of reactant gas inlet headers and a first transverse portion adjacent said coolant inlet header, a serpentine leg having a first end in fluid communication with said first transverse portion and a second end, and an exhaust leg having a second transverse portion adjacent said coolant exhaust header and in fluid communication with said second end of said serpentine leg and a second longitudinal portion in fluid communication with one of said pair of reactant gas exhaust header, wherein at least one of said first transverse portion of said inlet leg adjacent said coolant inlet header and said second transverse portion of said exhaust leg adjacent said coolant exhaust header defines an undulating flow channel.

2. The separator plate of claim 1 wherein said undulating flow channel in said first set of flow channels is formed in said first transverse portion of said inlet leg.

3. The separator plate of claim 1 wherein said undulating flow channel in said first set of flow channels is formed in said second transverse portion of said exhaust leg.

4. The separator plate of claim 1 wherein said undulating flow channel comprises at least two undulations.

5. The separator plate of claim 1 wherein said pair of reactant gas inlet headers are located laterally on either side of said coolant inlet header and said pair of reactant gas exhaust headers are located laterally on either side of said coolant exhaust header.

6. The separator plate of claim 1 wherein said flow field further comprises a second set of flow channels, each of said second set of flow channels having an inlet leg with a first longitudinal portion in fluid communication with said one of said pair of reactant gas inlet headers and a first transverse portion adjacent said coolant inlet header, a serpentine leg having a first end in fluid communication with said first transverse portion and a second end and an exhaust leg having a second transverse adjacent said coolant inlet header portion in fluid communication with said second end of said serpentine leg and a second longitudinal portion in fluid communication with said one of said pair of reactant gas exhaust headers, wherein at least one of said first transverse portion of said inlet leg and said second transverse portion of said exhaust leg defines an undulating flow channel.

7. The separator plate of claim 6 wherein said undulating flow channel in said second set of flow channels is formed in said first transverse portion of said inlet leg.

8. The separator plate of claim 6 wherein said undulating flow channel in said second set of flow channels is formed in said second transverse portion of said exhaust leg.

9. The separator plate of claim 6 wherein said undulating flow channel comprises at least two undulations.

10. The separator plate of claim 6 wherein said pair of reactant gas inlet headers are located laterally on either side of said coolant inlet header and said pair of reactant gas exhaust headers are located laterally on either side of said coolant exhaust header.

11. The separator plate of claim 1 wherein each of said first set of flow channels further comprise a third transverse portion adjacent said coolant inlet header having a first end in fluid communication with said first longitudinal portion, a second serpentine leg having a first end in fluid communication with said third transverse portion and a second end and a fourth transverse portion adjacent said coolant exhaust header and in fluid communication with said second end of said second serpentine leg and said second longitudinal portion, wherein at least one of said third transverse portion of said inlet leg adjacent said coolant inlet header and said fourth transverse portion of said exhaust leg adjacent said coolant exhaust header defines an undulating flow channel.

* * * * *